United States Patent [19]

Kloke

[11] Patent Number: 5,065,603
[45] Date of Patent: Nov. 19, 1991

[54] TUBULAR BICYCLE LOCK AND METHOD FOR MOUNTING SAME

[76] Inventor: Harrell F. Kloke, 1050 Santiago Dr., Newport Beach, Calif. 92660

[21] Appl. No.: 656,459

[22] Filed: Feb. 19, 1991

Related U.S. Application Data

[63] Continuation-in-part of Ser. No. 498,650, Apr. 26, 1990, abandoned.

[51] Int. Cl.$^5$ .................. B62H 5/00; E05B 71/00
[52] U.S. Cl. .................................. 70/233; 70/30; 70/49; 156/60; 224/901; 280/288.4; 403/267
[58] Field of Search ............ 70/18, 30, 49, 233, 70/234, 235, 225–227; 403/267, 265; 224/901; 280/288.4; 156/60

[56] References Cited

U.S. PATENT DOCUMENTS

| | | | |
|---|---|---|---|
| 1,447,303 | 3/1923 | Harrison | 70/227 |
| 2,451,100 | 10/1948 | Lecompte | 70/49 X |
| 3,021,250 | 2/1962 | La Voie . | |
| 3,910,081 | 10/1975 | Pender | 70/234 |
| 4,023,387 | 5/1977 | Gould | 70/233 |
| 4,044,577 | 8/1977 | Horlacher | 70/234 |
| 4,126,024 | 11/1978 | Timmons et al. | 70/49 X |
| 4,970,883 | 11/1990 | Johnson | 70/30 |

FOREIGN PATENT DOCUMENTS

| | | | |
|---|---|---|---|
| 132445 | 7/1901 | Fed. Rep. of Germany | 70/234 |
| 3330840 | 3/1985 | Fed. Rep. of Germany | 70/234 |
| 2276210 | 1/1976 | France | 70/233 |
| 2430535 | 3/1980 | France | 403/265 |
| WO83/00354 | 2/1983 | PCT Int'l Appl. | 70/233 |

Primary Examiner—Lloyd A. Gall
Attorney, Agent, or Firm—James G. O'Neill

[57] ABSTRACT

An elongated tubular bicycle lock having a groove formed longitudinally along the length thereof. A cable securing means is captured within the elongated tubular housing for withdrawal and retraction when used to secure a bicycle on which the lock is mounted to a fixed object. Also disclosed is a method of permanently mounting the tubular lock on the tubular frame of a bicycle utilizing a two-sided adhesive tape to bond the lock, along an elongated groove formed therein, to the tubular frame.

19 Claims, 1 Drawing Sheet

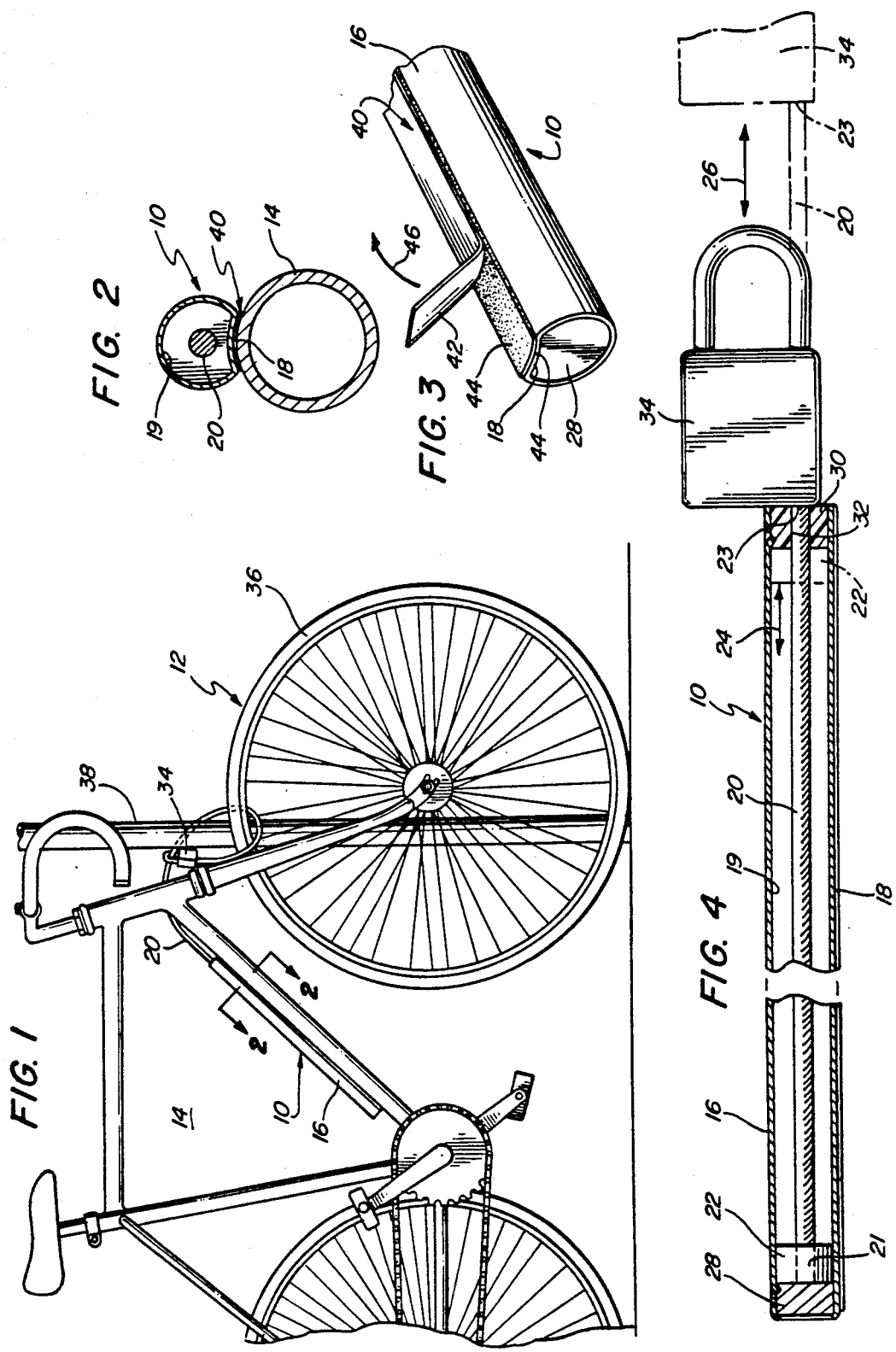

TUBULAR BICYCLE LOCK AND METHOD FOR MOUNTING SAME

CROSS REFERENCE TO RELATED APPLICATIONS

This application is a continuation-in-part of an application entitled PROCESSING AND BONDING TWO ROUND TUBES HORIZONTALLY WITH TAPE, filed Apr. 26, 1990 in the name of Harrell F. Kloke, Ser. No. 07/498,650, now abandoned.

FIELD OF THE INVENTION

This invention relates generally to locks and, more particularly, to a tubular bicycle lock shaped so as to be easily mounted to the tubular frame of a bicycle; and a method for quickly and easily bonding the tubular lock to the tubular frame of almost any bicycle.

BACKGROUND OF THE INVENTION

Over the years, many locks have been developed for use on or with a bicycle to prevent loss or unauthorized taking of the bicycle. The most common locks take many different shapes, have various locking elements or means, and are generally used with a chain or cable which is looped through the bicycle and attached to a secure post or the like. These locks, cables and/or chains, must be either carried by a bicycle rider, or somehow wrapped around or placed on the frame or some other portion of the bicycle, out of the way, for later removal and use when it is desired to lock the bicycle. However, because of their weight and/or size, many bicycle riders forget to or refuse to take such locks, cables and/or chains with them. Such riders, instead, prefer to always remain with their bicycles, or attempt to keep their bicycles in sight if they must leave it for any reason. Such riders, therefore, risk the loss of their bicycles because of the inconvenience in using or in carrying known bicycle locks, cables and/or chains with them. This loss could be prevented if a light weight, easy to use and readily available bicycle lock was available.

Furthermore, with the advent of expensive, lightweight bicycles having quick disconnect front wheels, it is even more important for the rider of such a bicycle to have a readily available and easy to use bicycle lock when the bike is left unattended. Such a lock must not only secure the bicycle but must also pass through and secure the front wheel, whether connected to or removed from the bicycle, so that it may not be taken, if only the frame of the bicycle is secured. Also, the bicycle lock should be light in weight and capable of not being easily forgotten or lost to enable riders of such lightweight, expensive bicycles to meet their perceived needs.

One proposed solution to some of the above set forth concerns is set forth in U.S. Pat. No. 4,023,387, Which discloses a bicycle lock that may be permanently mounted on the frame of a bicycle. The mounting of the lock is accomplished by hinged half sections which clamp together over a bicycle frame and which are secured in this position by various means such as tabs, screws, or the like. The lock includes a hollow interior in which a cable is resiliently retained and which cable is pulled from the interior of the lock, against the action of the resilient cable retaining means, to lock the bicycle to a secure post, or the like. When not in use, the cable is returned into the hollow interior, by action of the resilient retaining means.

In U.S. Pat. No. 2,451,100, a bicycle lock is set forth in which the lock includes a hollow housing which is normally affixed to the tubular frame of a bicycle by a tubular clip enclosing the horizontal bar of the frame. A locking chain is wound around an inner tube rotatably mounted within the housing. The chain is secured at one end within the housing and is pulled from the housing against the biasing action of a coiled spring. The chain is held in position, when pulled from the housing, by means of a ratchet and pawl holding means. The chain is returned to the interior of the lock housing by releasing the ratchet and pawl holding means, whereby the coiled spring acts to rewind the chain onto the inner tube.

Other proposed solutions include the use of cable or chain locking means held within the hollow interior portion of one of the elements of various bicycle frames. These cable or chain locking means are pulled from within and reinserted back into the hollow interior portions where they are stored, and include various means for securely holding them within the interior of the frames and for bringing them back into the frame when the cables or chains are not in use.

While the foregoing described prior art structures have provided some limited improvements and overcome some of the problems encountered when the rider forgets or fails to take a lock, cable and/or chain for a bicycle with him, they tend to be complex and expensive or add unneeded weight to a bicycle. Therefore, there remains a need in the bicycle lock art for a simple, lightweight lock that may be purchased off the shelf and which may be quickly and easily secured to the tubular frame of any size bicycle, in substantially any position, so as to be readily available and easily used. Furthermore, there exists the need for a method of easily affixing a tubular lock to the tubular frame of a bicycle.

SUMMARY OF THE INVENTION

Accordingly, it is a general object of the present invention to provide an improved bicycle lock. It is a particular object of the present invention to provide a method for mounting an improved tubular bicycle lock in various positions on the tubular frame of a bicycle. It is a still more particular object of the present invention to provide a method to secure an elongated tubular lock having a groove formed longitudinally thereof to a tubular bicycle frame. And, it is yet a further particular object of the present invention to provide an improved tubular bicycle lock having an exterior groove and interior cable means which is quickly and easily mounted on the frame of a bicycle.

In accordance with one aspect of the present invention, there is provided an elongated tubular lock having a longitudinal groove formed along the entire length thereof for attachment to and permanent bonding thereof to a tubular bicycle frame, with cable means held within the lock which is pulled out when the lock is to be used to lock the bicycle to a secure post or the like. The present invention further comprises a method for more easily bonding an elongated tubular bicycle lock to the tubular frame of a bicycle by the use of two-sided adhesive tape.

BRIEF DESCRIPTION OF THE DRAWINGS

The above and other features of the invention will be better understood from the following detailed description of the preferred embodiments illustrated in the accompanying drawing in which:

FIG. 1 is a partial side view of a bicycle having a lock of the present invention mounted thereon;

FIG. 2 is an enlarged section taken along line 2—2 of FIG. 1;

FIG. 3 is a partial perspective view illustrating the method of mounting the tubular lock on a tubular bicycle frame; and FIG. 4 is a longitudinal section of the preferred embodiment of the lock of the present invention.

DESCRIPTION OF THE PREFERRED EMBODIMENTS

Referring now more particularly to the accompanying drawing in which like and corresponding parts are designated by similar reference numerals throughout, numeral 10 generally indicates the improved bicycle lock of the present invention. In use, the bicycle lock 10 is preferably mounted toward the front of a bicycle 12 on any available portion of a tubular frame 14, as is shown in FIG. 1.

The elongated tubular lock 10 of the present invention includes a substantially circular, elongated tubular housing 16. The tubular housing 16 may be formed from any available nonrusting material, such as steel, aluminum, plastic or the like, and includes an inverted semicircular groove 18 formed on the exterior thereof. Groove ia extends longitudinally along the entire length of the housing 16 to enable the bicycle lock 10 to be more securely fastened or bonded to a tubular bicycle frame. The groove 18 is preferably formed in the circular housing 16 by one of the following methods. The circular tube, if formed from metal, is pushed or pulled through rollers that have been fashioned to produce the desired groove 18; or pulled through a die having the desired shape formed therein. Finally, if the elongated tubular housing is formed from a plastic, the groove 18 is molded into the tubular housing 16 during manufacture thereof.

The groove 18 is preferably sized so that it provides the maximum surface to be bonded. This has been determined to be twenty percent in depth and width of the outside diameter of the tubular housing. Additionally, the diameter of the tubular housing 16 is chosen so as to provide a ratio or proportion lying between one to two and one to three of the diameter of the tubular frame of a bicycle on which it is to be mounted. For example, if the tubular bicycle lock 10 is formed from a tubular housing 16 having an outside diameter of one-half inch, the tubular frame 14 of the bicycle on which it is to be mounted should have an outside diameter of between one inch (one to two) and one and a half inches (one to three) for the most effective bonding of the lock 10 to the frame.

The tubular bicycle lock 10 also includes a locking element, such as a chain or cable 20 having a stop 22 fixed to the inner end 21 thereof, as by crimping. The stop 22 is separately mounted within the hollow interior 19 of tubular housing 16, for reciprocable movement wherein, as shown by arrows 24 and 26 in FIG. 4. The tubular housing 16 is closed at both ends thereof by resilient cap or plug means 28 and 30, one of which has a tubular passage 32 formed therein through which cable 20 passes. The end caps capture the locking element 20 therein, by preventing the stop 22 from leaving the hollow interior 19 of housing 16. In the preferred embodiment of the invention, end caps 28 and 80 are formed from a strong plastic material, such as mylar, and are held in position in any known means, such as by crimping the housing 18. End cap 30 includes the passage 32 formed therethrough to enable outer end 23 of cable 20 to pass therethrough and extend outwardly from the interior 19 of housing 16. The outer end 23 has a locking means 34, such as a padlock or loop fixed at the end thereof as by soldering, welding or crimping.

It therefore can be seen, as more clearly shown in FIG. 1, that the cable 20 may be pulled out of interior 19 until stop 22 hits the interior of cap 3D, and wrapped around a fixed object such as a post, railing or the like, after having been passed through the frame 14 and a front wheel 36. The padlock 34 is then locked around the cable 20, or another locking means is passed through the looped end of the cable and locked around the cable.

When the cable 20 is withdrawn from the interior 19 of housing 16, the stop 22 also guides the cable within the hollow interior 19 as well as determining the length of movement of the cable and the attached locking means. In the preferred embodiment of the invention, the tubular housing 16 and the cable 20 are both approximately twenty inches long. However, in some cases the cable 20 is made several inches longer so that a loop may be formed on the outer end 23 thereof.

For smaller bicycles, such as dirt bikes or childrens' bicycles, the tubular housing 16 and cable 20 are preferably approximately eighteen inches long. Again, the cable 20 may have several inches added to its length, if it is desired to form a locking loop at the outer end 23 thereof.

A preferred method of permanently mounting or bonding a tubular lock 10 of the present invention to the tubular frame of a bicycle is more clearly shown in FIG. 2, wherein a two-sided adhesive tape 40, is held between, and bonds tubular housing 16 and tubular frame 14 together. The tape 40 may be inserted between and parallel to the two tubular elements before fixing them together, or as shown in FIG. 3, the tubular bicycle lock 10 may first have one side of the tape 40 fixedly attached to the groove 18 prior to mounting the tubular lock 10 on a tubular bicycle frame 14. When it is desired to mount the lock on a particular bicycle frame, such as bicycle frame 12 shown in FIG. 1, the remaining, outer liner 42, covering adhesive surface 44 is removed, in the direction of arrow 46, to expose adhesive surface 44. The adhesive surface 44 is then placed parallel to and pressed against the tubular frame 14 of bicycle 12 in any desired position, but preferably toward the front thereof In this manner, the adhesive surface 44 is permanently bonded along a desired elongated tubular portion of bicycle frame 14.

Depending on the type of material from which the tubular lock 10 and the tubular frame 14 are made, the two adhesive surfaces of tape 40 may be the same. However, if the material forming the tubular housing 16 is different from the material from which the frame 14 is made, the adhesive on the two sides of the tape may be different. In any event, the adhesive or adhesives used should be chosen so as to provide the most secure bond between the tubular bicycle lock 10 and the tubular frame 14 of the bicycle to which it is to be permanently secured.

Because of the shape of the elongated groove formed along the longitudinal length of the tubular housing 16 of the lock of the present invention, the maximum surface available for adhesion to the tubular frame 14 of a bicycle is obtained. Therefore, by merely removing the liner 42 from both sides of the adhesive tape 40, to uncover adhesive surfaces 44, the lock may be quickly and easily mounted on any tubular bicycle frame 14, without the need for tools. The lock 10 is simply firmly pressed to one of the adhesive sides 44 with the other adhesive side pressed against the tubular bicycle frame. The shape of elongated groove 18 ensures that the entire length and width of both adhesive surfaces 44 adhere to and are thereby bonded to the lock 10 and the tubular frame portion 14.

Since the dimensions of the various bicycles available to the public are different and the outside diameters of the tubular frames vary depending on the strength, and/or use of a bicycle, the longitudinal groove 18 could be formed of different sizes for use with bikes having different diameter tubular frames. In the preferred embodiment of the invention, the groove is preferably formed so that it is twenty percent of the diameter of the tubular housing 16 in both width and depth. That is, the inverted, curved, lengthwise extending longitudinal groove 18, formed in the tubular bike lock 10 should be twenty percent of the diameter in width and twenty percent of the diameter in depth of the outside diameter of tubular housing 16, which is preferably about one-half inch in diameter, to provide the best mating between the two tubular elements to be fixed together. This, in turn, provides for maximum surfaces bonding the two tubular elements together by means of the tape 40.

While the cable 20 may be made from any desired material, in the preferred embodiment of the invention, the cable is approximately three sixteenths of an inch in diameter and is made from galvanized steel. If desired, the cable may be coated with plastic or the like for ease in sliding and for protection against the elements.

To prevent the padlock 34 or the end loop formed on the outer end 23 of the cable from bouncing or coming loose when the tubular lock 10 is mounted on a bicycle, the end cap 28 may be formed with a releasable internal securing means, such as a tapered annulus. The stop 22 is then forced into and frictionally held in the tapered annulus when the padlock 34 and the cable 20 are firmly pushed all the way into the interior hollow area 19 of the tubular housing 16; but may be pulled out by overcoming the friction holding the stop 22 in the annulus.

Additionally, if desired, a velcro strip or similar securing means may be mounted on one surface of the padlock 34 with a mating portion of such a securing means mounted on the frame of the bike adjacent to where the padlock 34 would rest when the cable 20 is completely pushed back into the tubular housing 16. In this manner, when the padlock is in the rest position, with the cable 20 pushed entirely into the lock, the velcro strips, or other securing means, may be pushed together to hold the padlock in position, to thereby prevent it from accidentally moving and pulling out the cable 20.

It, therefore, can be seen that the present invention provides a novel lock which is simple and easy to make and which may be quickly mounted to the tubular frame of almost any bicycle, without the aid of any tools. Because the lock has few parts and is simple to manufacture, it will be inexpensive to purchase, and will not add significant weight to a bicycle on which it is used. Furthermore, it may be used to secure the frame and the front wheel of a bicycle to a stationary object, such as a pole, railing or the like. Additionally, the present invention provides a novel method for easily mounting a tubular bicycle lock to any desired portion of tubular frame of a bicycle by means of a two-sided adhesive tape held between and securely bonding the tubular lock to the tubular frame.

While the invention has been described in considerable detail, it is not to be limited to such details as have been set forth above, except as may be necessitated by the appended claims.

What is claimed is:

1. A method of permanently fastening a lock onto a bicycle frame comprising the steps of:
   providing a length of tubular bicycle frame;
   providing a tube having a longitudinal groove formed therein;
   providing a double-sided tape for bonding the formed tube onto said length of tubular bicycle frame; and
   assembling the double-sided tape adjacent the tubular bicycle frame and the longitudinal groove of the formed tube while the tubular frame and the longitudinal groove of the tube are parallel with each other to bond the tube to the tubular bicycle frame.

2. The method according to claim 1 further comprising forming said longitudinal groove by pulling said tube through rollers.

3. The method according to claim 1 further comprising forming said longitudinal groove by pulling metal through a die.

4. The method according to claim 1 further comprising forming said tube of plastic having said longitudinal groove formed by molding.

5. A bicycle lock comprising:
   an elongated tubular housing having two ends, an exterior surface and an interior surface bounding a hollow interior;
   end cap means fixedly held at both ends of said elongated tubular housing and enclosing said hollow interior;
   an elongated groove formed on and extending longitudinally along the length of the exterior surface of said elongated tubular housing; and
   a locking element captured within said hollow interior of said elongated tubular housing and passing through an opening formed in said lock and extending into said hollow interior, with a portion of said locking element capable of being pulled from and reinserted into said hollow interior through said opening, wherein a tape having adhesive on two sides thereof is fixedly attached by the adhesive on one side thereof within and along the exterior surface of said elongated longitudinal groove.

6. The bicycle lock of claim 5 wherein said opening is formed in one of said end caps and said locking element is a cable passing through said opening and having one end thereof extending beyond said one of said end caps to the exterior of said bicycle lock.

7. The bicycle lock of claim 6 wherein said cable has two ends, with a stop means fixedly attached to one end thereof for capturing said cable in said hollow interior and a locking means fixedly attached to the other end of said cable on the exterior of said bicycle lock.

8. The bicycle lock of claim 7 wherein said stop means is reciprocally mounted within said hollow interior for travel between said end caps.

9. The bicycle lock of claim 8 wherein said other of said end caps has formed on the interior surface thereof, adjacent said hollow interior, a releasable holding means for releasably holding said stop means when said stop means and said cable are pushed into said hollow interior and said stop means coacts with said releasable holding means.

10. The bicycle lock of claim 9 wherein said cable and said elongated tubular housing are substantially equal in length.

11. The bicycle lock of claim 5 wherein said elongated groove is formed of a size whereby its depth and width are twenty percent of the outside diameter of said elongated tubular housing, and said elongated tubular housing is one-half inch in diameter.

12. The bicycle lock of claim 11 wherein said elongated tubular housing is made from metal.

13. The bicycle lock of claim 11 wherein said elongated tubular housing is made from plastic.

14. The bicycle lock of claim 11 wherein a tape having adhesive on two sides thereof is fixedly attached by the adhesive on one side thereof within and along the entire exterior surface of said elongated longitudinal groove.

15. A bicycle lock comprising:
an elongated tubular housing having two ends, an exterior surface and an interior surface bounding a hollow interior;
end cap means fixedly held at both ends of said elongated tubular housing and enclosing said hollow interior with one of said end caps having a passage formed therethrough;
an elongated groove formed on and extending longitudinally along the entire length of the exterior surface of said elongated tubular housing;
a cable with two ends, the first end of which is captured within said hollow interior of said elongated tubular housing by a stop means fixedly attached to said first end, with said second end passing through the passage formed in said one of said end caps and extending out of said hollow interior with a locking means fixedly attached to said second end; and
a two-sided adhesive tape having one side thereof fixedly attached by the adhesive thereon within and along the entire exterior surface of said elongated groove, with the adhesive on the other side covered by a liner, which liner may be removed for mounting said bicycle lock on the tubular frame of a bicycle.

16. The bicycle lock of claim 15 wherein said other of said end caps has formed on the interior surface thereof, adjacent said hollow interior, a releasable holding means for releasably holding said stop means when said stop means and said cable are pushed into said hollow interior with said stop means coacting with said releasable holding means.

17. The bicycle lock of claim 15 wherein said cable and said elongated tubular housing are substantially equal in length.

18. The bicycle lock of claim 15 wherein said elongated groove is formed of a size whereby its depth and width are twenty percent of the outside diameter of said elongated tubular housing, and said elongated tubular housing is one-half inch in diameter.

19. The bicycle lock of claim 15 wherein said elongated tubular housing is made from metal.

* * * * *